Figure 1:
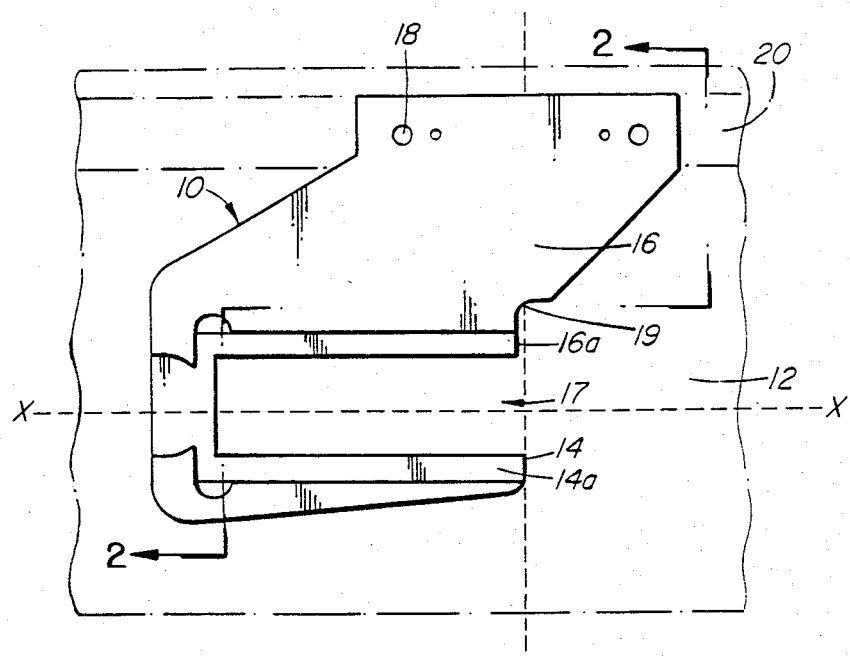

United States Patent [19]

Waggoner et al.

[11] Patent Number: 4,506,960

[45] Date of Patent: Mar. 26, 1985

[54] FERROGRAPHY APPARATUS

[75] Inventors: Clinton A. Waggoner; Harry P. Dominique; Gary A. Moonie; Bruce J. Kaye, all of Victoria, Canada

[73] Assignee: Her Majesty the Queen in right of Canada, Canada

[21] Appl. No.: 423,310

[22] Filed: Sep. 24, 1982

[30] Foreign Application Priority Data

Dec. 2, 1981 [CA] Canada .................................. 391390

[51] Int. Cl.³ .............................................. G02B 21/26
[52] U.S. Cl. ..................................... 350/529; 350/531
[58] Field of Search ................. 350/531, 529; 356/244

[56] References Cited

U.S. PATENT DOCUMENTS 2,120,404  6/1938  Graff .
2,279,412  4/1942  Posada .
3,572,888  3/1971  Kawashima .......................... 350/531
3,765,745 10/1973  Burboeck ............................. 350/531
4,159,875  7/1979  Hauser ................................. 356/244
4,262,991  4/1981  Wagener et al. ..................... 350/531

Primary Examiner—John K. Corbin
Assistant Examiner—Lynn Vandenburgh Kent
Attorney, Agent, or Firm—Cushman, Darby & Cushman

[57] ABSTRACT

The invention disclosed is a slide holder which facilitates viewing of the entire slide on a microscope. The holder comprises slide positioning means for positioning a slide for viewing in a horizontal position on a microscope stage and integral mounting plate means for attachment of the holder to the stage, specifically the lateral bar of the stage, such that the slide in viewing position is disposed centrally on said stage and laterally off-set from the center of the stage, and is movable with the lateral bar. The holder is particularly suitable for the positioning and viewing of thin slides typically used in ferrography.

4 Claims, 2 Drawing Figures

FERROGRAPHY APPARATUS

This invention relates to the optical analysis by microscope of hyperfine particulate materials deposited on a substrate from a liquid medium, and in particular to a substrate holder which facilitates viewing of the entire substrate on a microscope.

The use of magnetic techniques for separating ferromagnetic materials from background substances has been known for quite some time. Recent refinements of such techniques have made it possible to precipitate hyperfine ferromagnetic wear particles from a lubricant sample taken from a machine, such as a diesel engine, and to determine the wear condition of the machine by optical analysis of such particles. A detailed description of apparatus and procedures for performing such precipitation and analysis is set forth in U.S. Pat. No. 4,047,814, issued on Sept. 13, 1977 to Veron C. Westcott. Specifically, a lubricant sample is flowed along a shallow channel in an inclined glass substrate positioned over a magnet the air-gap of which is aligned with the longitudinal axis of the substrate. Ferromagnetic wear particles are drawn by magnetic force down from the lubricant liquid so as to deposit onto the substrate surface. The substrate is typically in the form of a thin rectangular glass slide, provided with a pair of spaced parallel Teflon ® strips secured to the edges of the slide to define a central liquid flow channel along the long dimension of the slide. In carrying out this procedure with ferromagnetic wear particles, the larger particles are precipitated first, and the smaller particles are pecipitated further along the flow path. Analysis, for example, by microscope, of the relative proportions of large and small size wear particles provides significant information about the state of wear of the machine from which the lubricant sample was taken.

A typical slide holder is described in Canadian Pat. No. 983,746, which issued in Feb. 17, 1976 to E. R. Berliner et al. Specifically, a conventional rectangular microscope slide is retained for viewing on the microscope stage between a jaw member extending forwardly against one edge of the short dimension of the slide, the opposite edge being retained by a spring-biased bell crank finger. The holder includes openings for attachment to upstanding pins on the lateral bar of the stage so that the holder can move laterally along the x-axis of the stage. Disadvantages of this arrangement include the inability to hold thin microscope slides employed in ferrography.

According to the invention a slide holder for facilitating viewing of the slide on a microscope is contemplated, said microscope including a stage upon which a slide is viewed, said holder comprising slide positioning means for positioning a slide for viewing in a horizontal position on said stage, and integral mounting plate means for attachment of the holder to said stage such that the slide in viewing position is disposed centrally on said stage and laterally off-set from the centre of said stage, to facilitate viewing of the entire slide.

Figure 2:
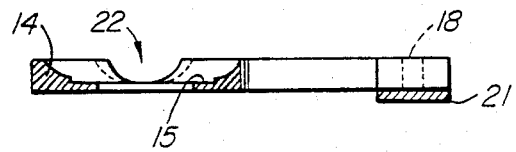

In the drawings which serve to illustrate a preferred embodiment of the invention, FIG. 1 is a plan view of a slide holder according to the invention as positioned for viewing on a microscope stage, and FIG. 2 is a slide elevation in section of a slide holder according to the invention taken along line 2—2 of FIG. 1.

Referring to the drawings, in FIG. 1, the slide holder 10 is illustrated in viewing position on the stage of a microscope 12.

Slide positioning means in the form of a open-ended frame 14 is provided for positioning a slide in a horizontal position for viewing. The frame 14 comprises a fixed jaw member 14a which together with a plate portion 16a defines a slide receiving opening 17. Plate portion 16a includes a cutaway 19 to facilitate gripping of the slide with an index finger for insertion and removal of the slide.

As best seen in FIG. 2, the frame includes a groove 15 of about the same dimensions as a microscope slide (in this case, a glass ferrogram slide 60×24 mm, #2 thickness—0.010 inches). A trough 22 is machined in the holder above groove 15 to permit free rotation of the turret which carries the objective lenses of the microscope without having to raise the turret or move the slide during viewing. The open-end facilitates loading and unloading of slides. The frame 14 at groove 15 where the slide rests is sufficiently thin (about 0.040 inches) to permit focussing of the microscope condenser lens.

Mounting plate means 16 integral with the frame 14 is provided for attachment of the holder to the lateral bar 20 of the microscope stage. Openings 18 are provided in plate 16 to accept upstanding pegs on conventional microscope stages. The lateral bar 20 serves to move the holder back and forth laterally across the stage along the X (abscissa) co-ordinate axis, while movement in the Y (ordinate) axis is integral with the stage movement. A metal spacer bar 21 is provided to prevent rubbing contact of the holder with the microscope stage 12, as the holder moves in conjunction with lateral bar 20 across the microscope stage 12, thus extending the life of the holder.

Thus, a slide positioned for viewing in frame 14 is disposed centrally on the stage 12 and laterally off-set, along the x-axis, from the centre of the stage, to facilitate viewing of the entire slide. The off-set enables viewing and setting of the microscope stage scale (not shown) to zero to facilitate indexing of the entire long dimension of the slide.

It will be appreciated by those skilled in the art that while this description is restricted to a machined holder typically of aluminum, it is contemplated that conventional molding techniques could readily be applied using various materials without departing from the substance of this invention.

The embodiments of the invention in which an exclusive property or privilege is claimed are defined as follows:

1. A slide holder for use in conjunction with a microscope, said microscope including a stage upon which a slide is viewed and a lateral bar which is moveable laterally across the stage along the X coordinate axis of said stage, said holder comprising
    slide positioning means for positioning a slide for viewing in a horizontal position on said stage, and
    integral mounting plate means for attachment of the holder to said lateral bar such that the slide in viewing position is disposed centrally on said stage with respect to the Y coordinate axis and laterally off-set along the X coordinate axis from the center of said stage, to facilitate viewing of the entire slide without repositioning said slide.

2. A slide holder according to claim 1, wherein said slide positioning means is in the form of an open-ended frame defined by a fixed jaw member which together with said mounting plate means defines a slide receiving opening, said opening including a slide-retaining groove.

3. A slide holder according to claim 2, wherein a trough is provided in said frame above said groove to permit free rotation of the microscope turret without having to raise the turret or move the slide.

4. A slide holder according to claim 1, 2 or 3 additionally comprising a spacer bar attached to the underside of said plate to prevent contact between said plate and said microscope stage.

* * * * *